US008426061B2

United States Patent
Nesper et al.

(10) Patent No.: US 8,426,061 B2
(45) Date of Patent: Apr. 23, 2013

(54) NITRIDE AND CARBIDE ANODE MATERIALS

(75) Inventors: Reinhard Nesper, Amden (CH); Dipan Kundu, Zürich (CH); Rahul Fotedar, Zürich (CH); Michael Woerle, Zürich (CH); Helmer Fjellvag, Oslo (NO)

(73) Assignee: Belenos Clean Power Holding AG, Bienne (CH)

( * ) Notice: Subject to any disclaimer, the term of this patent is extended or adjusted under 35 U.S.C. 154(b) by 205 days.

(21) Appl. No.: 12/722,281

(22) Filed: Mar. 11, 2010

(65) Prior Publication Data

US 2010/0233546 A1  Sep. 16, 2010

Related U.S. Application Data

(60) Provisional application No. 61/159,722, filed on Mar. 12, 2009.

(30) Foreign Application Priority Data

Apr. 1, 2009 (EP) .................... 09157136

(51) Int. Cl.
*H01M 4/02* (2006.01)
(52) U.S. Cl.
USPC ....... 429/209; 429/223; 429/231; 429/231.95

(58) Field of Classification Search .............. 429/209, 429/223, 231, 231.95
See application file for complete search history.

(56) References Cited

U.S. PATENT DOCUMENTS

| 7,229,713 | B2 | 6/2007 | Yamamoto et al. |
| 7,387,851 | B2 | 6/2008 | Gozdz et al. |
| 2002/0192551 | A1 | 12/2002 | Yoshizawa et al. |
| 2003/0099884 | A1 | 5/2003 | Chiang et al. |
| 2004/0131934 | A1* | 7/2004 | Sugnaux et al. ............ 429/209 |

(Continued)

FOREIGN PATENT DOCUMENTS

| DE | 10 2004 053479 A1 | 5/2006 |
| EP | 1 244 114 A | 9/2002 |

(Continued)

OTHER PUBLICATIONS

Dissertation ETH No. 12281 by M. E. Spahr, "Synthese und Charakterisierung neuartiger Oxide, Kohlenstoffverbindungen, Silicide sowie nanostrukturierter Materialien und deren elektro- und magnetochemische Untersuchung" ("Synthesis and characterization of new types of oxides, carbon compounds, silicides and nano-structured materials and their electro- and magneto-chemical analysis."). 1997.

(Continued)

*Primary Examiner* — Jane Rhee
(74) *Attorney, Agent, or Firm* — Griffin & Szipl, P.C.

(57) ABSTRACT

Described is an anode material which is a transition metal nitride or carbide in form of nanoparticles, preferably a nitride or carbide with one nitrogen or carbon per metal, and especially a nitride or carbide having rock salt structure. A preferred anode material is vanadium nitride, in particular carbon coated vanadium nitride having a mean particle size of <500 nm. Embedded in an electrically conducting environment, such nanoparticulate material, in particular the vanadium nitride shows exceptional good charging-discharging cycle stability.

12 Claims, 4 Drawing Sheets

U.S. PATENT DOCUMENTS

| | | | |
|---|---|---|---|
| 2004/0202934 | A1 | 10/2004 | Zaghib et al. |
| 2004/0241532 | A1 | 12/2004 | Kim |
| 2006/0127773 | A1 | 6/2006 | Kawakami et al. |
| 2007/0054187 | A1 | 3/2007 | Nuspl et al. |
| 2007/0148545 | A1* | 6/2007 | Amine et al. ............. 429/231.1 |
| 2008/0248393 | A1 | 10/2008 | Richard et al. |
| 2008/0285211 | A1 | 11/2008 | Zaghib et al. |
| 2009/0035662 | A1 | 2/2009 | Scott et al. |
| 2009/0305135 | A1* | 12/2009 | Shi et al. ..................... 429/217 |
| 2010/0176337 | A1 | 7/2010 | Zhamu et al. |
| 2010/0233538 | A1 | 9/2010 | Nesper et al. |

FOREIGN PATENT DOCUMENTS

| | | |
|---|---|---|
| EP | 1 244 168 A | 9/2002 |
| EP | 1 881 544 A1 | 1/2008 |
| JP | 2005-032733 A | 2/2005 |
| WO | 01/41238 A1 | 6/2001 |
| WO | 2005/051840 A1 | 6/2005 |

OTHER PUBLICATIONS

"Insertion Electrode Materials for Rechargeable Lithium Batteries" by Martin Winter, Jürgen O. Besenhard, Michael E. Sparh and Petr Novák in Advanced Materials Nov. 10, 1998, No. 10, pp. 725 to 763.

Yong-Jun Li, Wei-Jun Huang and Shi-Gang Sun, Angewandte Chemie, 118, 2599 (2006), "A Universal Approach for the Self-Assembly of Hydrophilic Nanoparticles into Ordered Monolayer Films at a Toluene/Water Interface".

Padhi, A.K., Nanjundaswamy, K.S. and Goodenough, J.B., J. Electrochem. Soc., 144, 1188 (1997), "Phospho-olivines as Positive-Electrode Materials for Rechargeable Lithium Batteries".

S. Franger, F. Le Cras, C. Bourbon and H. Rouault, Electrochem. Solid-State Lett., 5, A231 (2002), "LiFePO4 Synthesis Routes for Enhanced Electrochemical Performance".

S. Yang, P.Y. Zavalij and M.S. Whittingham, Electrochem. Commun., 3, 505 (2001), "Hydrothermal synthesis of lithium iron phosphate cathodes".

S. Franger, F. Le Cras, C. Bourbon and H. Rouault, J. Power Sources, 119, 252 (2003), "Comparison between different LiFePO4 synthesis routes and their influence on its physico-chemical properties".

Chung, S.-Y., Bloking, J.T. and Chiang, Y.-M., Nature Mater., 1, 123 (2002), "Electronically conductive phospho-olivines as lithium storage electrodes".

S.Y. Chung and Y.-M. Chiang, Electrochem. Sold-State Lett., 6, A278 (2003), "Microscale Measurements of the Electrical Conductivity of Doped LiFePO4".

F. Croce, A.D. Epifanio, J. Hassoun, A. Deptula, J. Olczac and B. Scrosati, Electrochem. Solid-State Lett., 5, A47 (2002), "A Novel Concept for the Synthesis of an Improved LiFePO4 Lithium Battery Cathode".

A. Yamada, S.C. Chung and K. Hinokuma, J. Electrochem. Soc., 148, A224 (2001), "Optimized LiFePO4 for Lithium Battery Cathodes".

Zhaouhui Chen and J.R. Dahn, J. Electrochem. Soc., 149, A1184 (2002), "Reducing Carbon in LiFePO4 ÖC Composite Electrodes to Maximize Specific Energy, Volumetric Energy, and Tap Density".

Prosini P.P., Zane, D. and Pasquali, M., Eletrochim. Acta, 46, 3517 (2001), "Improved electrochemical performance of a LiFePO4-based composite cathode".

G. Heywang and F. Jonas, Adv. Mater., 4, 116 (1992), "Poly (alkylenedioxyt hiophene)s- New, Very Stable Conducting Polymers".

L.B. Groenendaal, F. Jonas, D. Freitag, H. Pielartzik and J.R. Reynolds, Adv. Mater. Weinheim, Ger., 12, 481 (2000), "Poly(3,4-ethylenedioxythiophene) and Its Derivatives: Past, Present, and Future".

H. Yamato, M. Ohwa and W. Wernet, J. Electroanal. Chem., 379, 136 (1995), "Stability of polypyrrole and poly ( 3,4_ ethylenedioxythiophene) for biosensor application".

I. Winter, C. Reese, J. Hormes, G. Heywang and F. Jonas, Chem. Phys., 194, 207 (1995), "The thermal ageing of poly ( 3,4-ethylenedioxythiophene).An investigation by X-ray absorption and X-ray photoelectron spectroscopy".

Vadivel Murugan A et al., "Rapid microwave-solvothermal systhesis of phospho-oliving nanorods and their coating with a mixed conducting polymer for lithium ion batteries," Electrochemistry Communication, vol. 10, No. 6, Jun. 1, 2008, pp. 903-906.

Yang et al., "Conducting polymeric nanoparticles synthisized in reverse micelles and their gas sensitivity based on quartz crystal microbalance," Polymer, vol. 48, No. 15, Jul. 5, 2007, pp. 4459-4465.

Xinyu Zhang et al., "Chemical Synthesis of PEDOT Nanotubes," Macromolecules, vol. 39, Jan. 1, 2006, pp. 470-472.

Office Action issued in co-pending U.S. Appl. No. 12/721,669 on Jul. 19, 2012.

Office Action issed in co-pending related U.S. Appl. No. 12/722,269 on Jun. 21, 2012.

Office Action issued in co-pending related U.S. Appl. No. 12/722,269 on Feb. 1, 2013.

* cited by examiner

XRD pattern of Carbon coated VN:

XRD pattern of Carbon coated VN:

Negligible Changes in structure after lithiation.

NITRIDE AND CARBIDE ANODE MATERIALS

This application claims priority from U.S. corres. to U.S. Provisional Patent Application No. 61/159,722 of Mar. 12, 2009 and European Patent Application No. 09157136.4 of Apr. 1, 2009 the entire disclosure of which is incorporated herein by reference.

TECHNICAL FIELD

This invention relates generally to electrode materials for lithium ion batteries, and, more specifically, to lithium intercalating materials.

BACKGROUND ART

Present commercial rechargeable batteries use graphitic carbons as the anodic active material. They exhibit good dimensional stability, stable cycling performance, are relatively cheap and readily available. Their intercalation chemistry and reactivity towards lithium is well understood. Graphite can intercalate one lithium per six carbon atoms, limiting its theoretical specific capacity to 372 Ah/kg. This capacity however does gradually drop with cycling resulting from the decomposition reactions of carbon with the electrolyte [1,2] and/or the delamination of the graphite. $Li_4Ti_5O_{12}$ is another widely studied intercalation material due to the minimal changes that occur in its unit cell upon insertion of up to one lithium per formula unit. Small structural hysteresis coupled with rapid lithium diffusion makes this material electrochemically interesting [3]. However, a low electronic conductivity which leads to an initial capacity loss is the main obstacle preventing its commercial application [4].

Although Li based alloys (e.g. $Li_xM$, M=Al, Si, Ge, Sn, Pb, and Bi) show very high specific capacity, volume changes upon lithiation and delithiation induce high mechanical stress followed by pulverization of the electrode [5,6]. A good example is aluminium which reacts with lithium at 0.3 V vs. $Li/Li^+$ to form LiAl. Even though both Al and LiAl have a fcc (face centered cubic) structure, aluminium atoms no longer occupy the same positions because the grand crystal structure changes. This phase transition is accompanied by a 200% volume expansion compared to pure aluminium and hence the aluminium electrodes fail to maintain their structural integrity upon electrochemical cycling. Intermetallic insertion hosts such as $Cu_6Sn_5$ [6-8] show reasonable gravimetric and volumetric capacities without any excessive dimensional changes. In the case of $Cu_6Sn_5$, the electrochemical reaction with lithium induces a phase transition from the nickel arsenide type structure to the zinc blende type structure. However, the displacement of large tin atoms during the structural change slackens the kinetics and induces hysteresis during cycling.

Nanostructured $Fe_2O_3$ [9], $Fe_3O_4$ [10], $Co_3O_4$ [11] were shown to have great potential as negative electrode materials. In their cases the electrochemical reactions proceed by a complete reduction of the metal oxide to the metallic particles, referred to as a 'conversion reaction'. Different transition metal fluorides ($FeF_3$, $CoF_3$) [12] and phosphides ($CoP_3$, $NiP_2$, $VP_4$) [13-15] undergo conversion reactions with lithium resulting in high specific capacities. However, these reactions fundamentally suffer from poor kinetics that leads to a large polarization (i.e. a hysteresis between the charge and the discharge voltage), poor capacity retention on cycling, irreversible capacity loss in the first cycle and low columbic efficiency.

Another promising class of materials are metal nitrides. Metal nitrides, are interesting materials because they have a high melting point, are chemically inert and resistant to moisture and erosive environments. Additionally, in comparison to oxides transition metal nitrides show a lower intercalation potential, due to the lower electronegativity and larger polorizability of nitrogen.

Some ternary lithium nitrides crystallise with a filled-up antifluorite structure ($Li_{2x-1}MN_x$ (M=Fe, Mn, V)) or with a layered $Li_3N$ ($Li_{3-x}M_xN$ (M=Co, Ni, Cu)) type structure. Lithium extraction from these materials induces the formation of an amorphous phase $LiM_xN$. The antifluorite systems $Li_7MnN_4$ and $Li_3FeN_2$ have interesting electrochemical behaviour although their specific capacities are poor (about 250 Ah/kg) [20-22] and remain unstable. In their cases the deintercalation of lithium results in the formation of new undefined phases with lower lithium content [22, 24]. Amongst all studied ternary nitrides, $Li_{2.6}Co_{0.4}N$ exhibits the best stability and a large capacity of 700 Ah/kg [16-19]. These results however remain questionable because electroneutrality demands a switch from $Co^{1+}$ to $Co^{4.25+}$ on going from $Li_{2.6}Co_{0.4}N$ to $Li_{1.3}Co_{0.4}N$ corresponding to the capacity claim of 700 Ah/kg, which is highly unrealistic with a nitrogen coordination.

However, a major limitation of many nitrides is their spontaneous decomposition under ambient conditions by reaction with water and oxygen. They react with water by means of an acid-base reaction releasing ammonia and conversion of the nitrides to oxides and hydroxides. Their interaction with oxygen may replace nitrogen by a redox reaction leading to the formation of gaseous nitrogen along with other oxides [24].

The use of binary nitrides like silicon oxy nitride, $Si_3N_4$ [25], InN [26], $Zn_3N_2$ [27], $Cu_3N$ [28], $Co_3N$ [29], $Fe_3N$ [29], $Ge_3N_4$ [30] was studied as a possible solution because of their enhanced stability and because they do not require any prior delithiation. All of these materials have been reported to undergo irreversible conversion reactions with lithium forming amorphous $Li_3N$ matrices and metal nanoparticles as shown in the equation [31]:

$$M_xN_y + 3yLi^+ + 3ye^- \rightarrow xM + yLi_3N \quad (1)$$

Upon electrochemical reaction with lithium $Zn_3N_2$ exhibits a large reduction capacity of 1325 Ah/kg corresponding to the insertion of 3.7 Li per Zn atom. This capacity however decreases within a few cycles until it tends to stabilize around 550 Ah/kg. The formation of LiZnN as the new end member of the electrochemical reaction with lithium was identified as the cause of the irreversible loss observed during the first cycle. Very poor cycle life limits the prospect of this material. $Cu_3N$ exhibits good cycling efficiency but the copper nitride conversion process is sluggish and the voltage profile is not optimal for commercial applications [28]. In spite of a high capacity of 500 Ah/kg and good cycling stability, the use of $Ge_3N_4$ is prohibitive because of its high costs [30].

Amongst various binary nitrides, vanadium nitride (VN) is an interesting material because of its high electronic conductivity as well as mechanical and thermodynamical stability. Vanadium is a widely available, cheap and non toxic metal. Additionally, the nitrides of vanadium in comparison to its oxides exhibit good electronic conductivity. Superconductivity of VN and its dependence on V/N stoichiometric ratio has been studied extensively [32]. Recently VN has been shown to act as a supercapacitor delivering an impressive specific capacitance of 130 F $g^{-1}$ [36].

Vanadium nitride thin films have been investigated as anode material for future rechargeable lithium batteries [37].

Such films were prepared by magnetron sputtering and they were shown to decompose to V metal after discharging to 0.01 V [37].

DISCLOSURE OF THE INVENTION

Hence, it is a general object of the invention to provide improved anode materials with high reversible discharge capacity and constant discharge capacity over several hundreds of charge-discharge cycles, anodes made therefrom, methods for their production, and their use in rechargeable lithium batteries.

Now, in order to implement these and still further objects of the invention, which will become more readily apparent as the description proceeds, the anode material is manifested by the features that it is a nanoparticulate transition metal (M) nitride or carbide. Preferably, the stochiometry of the anode material is such that the transition metal nitride or carbide has between 0.5 and 1.5 nitrogen or carbon atom per metal atom. Furthermore, the anode material is preferably of type MN or MC, much preferred with rock-salt structure or another structure type with large Madelung factor (i.e. CsCl, Zincblende, Wurtzite, NiAs types). Such preferred nitrides and carbides are generally referred to as interstitial nitrides and carbides.

Preferred transition metals for weight reasons are 3d and possibly 4d metals while the 5d metals generally are too heavy for the desired applications.

It is widely believed that interstitial nitrides and carbides can be formed by transition metals where there is a sufficient difference in size between the metal atom and the nitrogen or carbon to allow the host metal lattice to accommodate the nitrogen or carbon atom. This condition is supposed to be true for several of the group 4, 5 and 6 transition metals. For nitrides, sufficiency of the difference in the metallic radius and the nitrogen radius is given e.g. for the Titanium, Vanadium and Chromium groups, i.e. metallic radii down to 128 pm (chromium). Some radii are shown in Table 1 (Actually, the stability of these compounds is determined much more by the level of the Coulombic energy and the strength of the covalent interaction then by the size of the metal atoms).

TABLE 1

| Metal | Metallic radius (pm) |
|---|---|
| titanium | 147 |
| zirconium | 160 |
| hafnium | 159 |
| vanadium | 134 |
| niobium | 146 |
| tantalum | 146 |
| chromium | 128 |
| molybdenum | 139 |
| tungsten | 139 |

The group 4 and group 5 nitrides are refractory i.e. high melting and chemically stable.

The carbides of the group 4, 5 and 6 transition metals (with the exception of chromium) are also interstitial compounds. These carbides are chemically quite inert, have metallic properties and are refractory. Some exhibit a range of stoichiometries.

The longheld view is that the carbon atoms fit into octahedral interstices in a close packed metal lattice when the metal atom radius is greater than approximately 135 pm: Rock salt structure is formed, when the metal atoms are cubic close packed, (ccp). In this case filling all of the octahedral interstices with carbon achieves 1:1 stoichiometry.

The following Table 2 shows actual structures of some metals and their carbides. Therein ccp means cubic close packed, hcp means hexagonal close packed and cbc means cubic body centered.

TABLE 2

| Metal | Structure of pure metal | Metallic radius (pm) | MetC- metal atom packing | MetC structure |
|---|---|---|---|---|
| titanium | hcp | 147 | ccp | rock salt |
| zirconium | hcp | 160 | ccp | rock salt |
| hafnium | hcp | 159 | ccp | rock salt |
| vanadium | cbc | 134 | ccp | rock salt |
| niobium | cbc | 146 | ccp | rock salt |
| tantalum | cbc | 146 | ccp | rock salt |
| chromium | cbc | 128 | | |
| molybdenum | cbc | 139 | | hexagonal |
| tungsten | cbc | 139 | | hexagonal |

As can be seen from the above table, the simple view that the lattice of the pure metal "absorbs" carbon atoms is untrue as the packing of the metal atom lattice in the carbides is different from the packing in the pure metal. The hitherto known 1:1 carbides of chromium, molybdenum and tungsten do not have rock salt structure although molybdenum and tungsten have suitable metallic radius. However, unless they are in rock-salt structure, these carbides are less preferred anode materials.

Since in battery applications the weight is always an important factor, nitrides and carbides of lower weight transition metals, i.e. 3d and 4d transition metals, are preferred, such as titanium, zirconium, vanadium, niobium, chromium and molybdenum.

The nitrides and carbides of the present invention are used in nanoparticulate form, i.e. with particle sizes <500 nm, in particular nanoparticles having an average particle size in the range of 5 to 500 nm, preferably in the range of 5 to 400 nm, more preferred in the range of 5 to 300 nm.

Anodes with such nanoparticulate materials can be prepared by mixing such nanoparticles with electronically conducting particles such as carbon black and/or graphite and a binder or in an alternative embodiment with a nanoparticulate electrically conducting binder.

In case that the nanoparticles themselves are not sufficiently electrically conducting, they may be and preferably are coated with a carbon coating.

In a preferred anode, the electrode material is a nanocomposite, that is
 an open porous material,
 electrically conducting
 allowing for electrolyte uptake and Li+ exchange, and
 being flexible with respect to volume changes.

In one embodiment the nanocomposite anode material comprises homogeneously distributed nanopariculate electronically active material (EAM) and nanoparticulate electrically conducting binder material (CB), with the mean particle sizes of the nanoparticles of the electronically active material and the average particle sizes of the nanoparticulate binder material
 both differing not more than a size factor of 2 (+100%/−50%) and/or
 both being in the range of <500 nm (mean particle size), in particular in the range of 5 to 500 nm, preferably in the range of 5 to 400 nm, more preferred in the range of 5 to 300 nm.

An open porous material means that the pores are so large and so interconnected that electrolyte and $Li^+$-diffusion is easily possible.

The nanocomposite of the present invention comprises the EAM and the CB nanoparticles intimately mixed with each other and preferably stabilized either due to sufficient stickiness of the binder at mixing, storage and usage temperature or by a pressure treatment with or without heating. A thermoplastic material with low glass transition point of the conductive binder is preferred not only for binding the particles but also for binding the nanocomposite to the conductor, usually an aluminium electrode/substrate.

Electrically conductive polymers encompass polyacetylene, polyaniline, polypyrrol and polythiophen. These polymers can be substituted or unsubstituted dependent on the desired features. A presently preferred binder is poly(3,4-ethylenedioxythiophene) referred to below as PEDOT. This polymer is conductive, has suitable stickiness and can readily be produced in nanoparticular form.

In a specific embodiment, the CB nanoparticles are present in an amount of 4 to 10% based on the weight of the nanocomposite.

As already mentioned above, in case that the EAM particles are of an insulating material or in order to improve their conductivity, the nanoparticles are coated with a conductive layer, in particular with a carbon/graphite layer.

Methods for producing nanoparticulate EAM, coating nanoparticulate EAM, producing nanoparticulate CB, and producing a nanocomposite of the present invention are described below.

The EAM may be prepared via pyrolysis or via solvent chemistry or by gas treatment of metals in the absence of oxygen. A suitable method for producing nitrides is by reacting a solvent soluble metal halide, e.g. $MX_4$ with $M'NH_2$ wherein M is a transition metal and M' is an alkaline metal such as Na, K.

Carbon coating of nanoparticulate EAM may be performed by carbon deposition via pyrolysis of various organic precursors such as e.g. sugars.

Nanoparticulate electrically conductive polymers such as Poly (3,4-ethylenedioxythiophene) (PEDOT) may be prepared using the reverse microemulsion technique as described by Sun et al. [38]. In the case of PEDOT synthesis, a microemulsion is prepared comprising emulsified oxidant comprising particles/droplets such as $FeCl_3$/bis(2-ethylhexyl) sulfosuccinate particles as polymerization aid.

For forming the nanocomposite of the present invention, the nanoparticulate CB is preferably suspended in a suitable solvent such as acetonitril, and the nanoparticulate, carbon coated EAM is then added and the mixture homogenized, dried and optionally pressed with or without heating. If desired, additionally a conductive nanoparticulate filler such as carbon black may be added.

PEDOT is an attractive candidate as a nanoparticulate conductive polymeric binder. Its advantages are high chemical and environmental stability, easy synthesis in various particle sizes and its stickiness that leads to a good interparticular adhesion and sufficient substrate adhesion upon pressurizing with a pressure of 0.5 to 2 bar or $5 \cdot 10^4$ to $2 \cdot 10^5$ Pa, respectively, at room temperature.

Dependent on the stability desired, heating can be absent since the small particles are sticky due to Van-der-Waals forces and surface binding sites.

BRIEF DESCRIPTION OF THE DRAWINGS

The invention will be better understood and objects other than those set forth above will become apparent when consideration is given to the following detailed description thereof. Such description makes reference to the annexed drawings, wherein the Figures show.

MODES FOR CARRYING OUT THE INVENTION

The present invention is now further described for the example VN in combination with various matrixes, namely pure VN with usual (non conductive) binder, pure VN with carbon black/graphite filled binder and carbon coated VN with carbon black/graphite filled binder.

As an alternative, preferably carbon coated VN can be mixed with nanoparticulate conductive binder.

EXPERIMENTAL

Example 1

Synthesis of Nanocrystalline Vanadium Nitride

The synthesis of nanocrystalline vanadium nitride was followed as described by Qian et al. [33]. The product was synthesized employing a reduction-nitridation reaction between vanadium tetrachloride ($VCl_4$) and sodium amide ($NaNH_4$).

The chemical equation of the reaction is as follows:

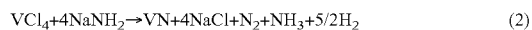

$$VCl_4 + 4NaNH_2 \rightarrow VN + 4NaCl + N_2 + NH_3 + 5/2H_2 \quad (2)$$

(one should note that this reaction is not limited to $VCl_4$ but is applicable to other transition metal halides too).

Figure 1:
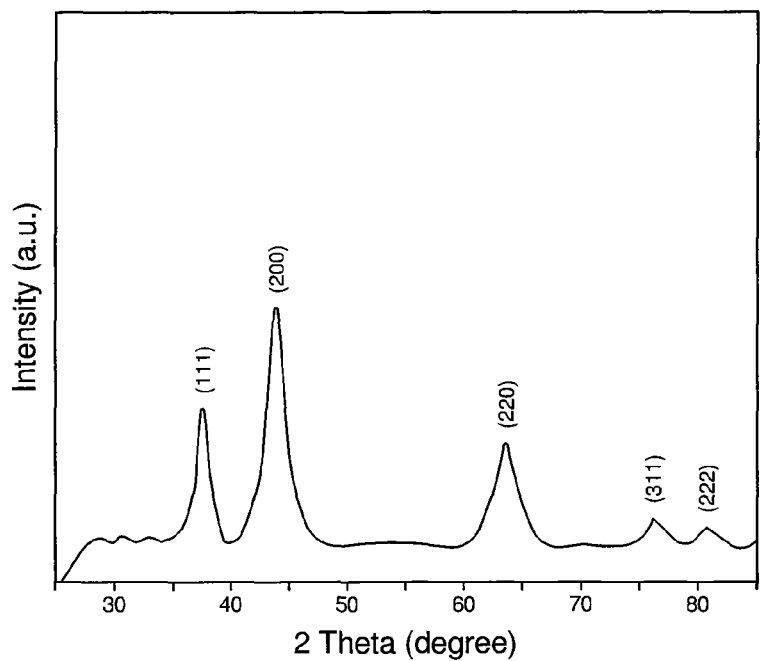
FIG. 1: XRD pattern of pure nanocrystalline VN synthesised at room temperature

The synthesis was carried out in a glove box with an inert argon environment. $NaNH_2$ (0.04 mol) was first added into a crucible and then $VCl_4$ (0.01 mol) was dripped slowly into the crucible at room temperature (25° C.). The addition of $VCl_4$ was followed by its very fervent reaction with $NaNH_2$, resulting in the formation of VN. The product was then washed thoroughly with water and ethanol to remove by-products and impurities. Finally, the end product was vacuum dried extensively to remove any traces of water or solvent FIG. 1 shows the XRD powder pattern of the as-synthesised product. All the peaks match the powder pattern of pure cubic VN (space group Fm3m; rocksalt type). The broad XRD pattern clearly indicates the nanometric size of the VN particles. No crystalline phases of vanadium oxide were observed in the VN sample prepared at room temperature. The primary particle size of VN is calculated using the Scherrer formula, $d = 0.9\lambda/\beta \cos\theta$, where $\beta$ is the width at the half maximum of the XRD line and $\lambda$ is the wave length in angstrom. The average crystal size calculated from the Bragg reflection line (200) is about 5 nm. The lattice parameter of the obtained pattern is refined and found to be 4.141 Å which is practically identical to the value of 4.139 Å for stoichiometric VN (JCPDS 35-0187).

High resolution transmission electron microscopy (HR-TEM) (not shown in the Figures) showed agglomerates of VN particles. The particles appeared to be spherical and no impurities could be visually observed in the image. The Selected Area Electron Diffraction (SAED) (not shown in the Figures) showed three clear diffraction rings which perfectly corresponded to (111), (200) and (220) separation planes of the crystalline VN.

Example 2

Carbon Coating of Vanadium Nitride

Pure VN was carbon coated using lactose as an organic precursor. A solution of lactose was made in water and then mixed with VN. The amount of lactose used was 15 wt. % with respect to the weight of VN. The mixture was dried and then put in a niobium vial for heating. The vial was gently sealed leaving some vent for the released carbon dioxide and other gases to escape. The whole process was carried out under nitrogen flow to avoid any side reactions. The following temperature program was used for the pyrolysis of lactose: heating from room temperature to 600° C. with a heating rate of 100° C./hr, keeping a temperature of 600° C. for 5 hours and then cooling to room temperature with a cooling rate of 100° C./hr.

Figure 2:
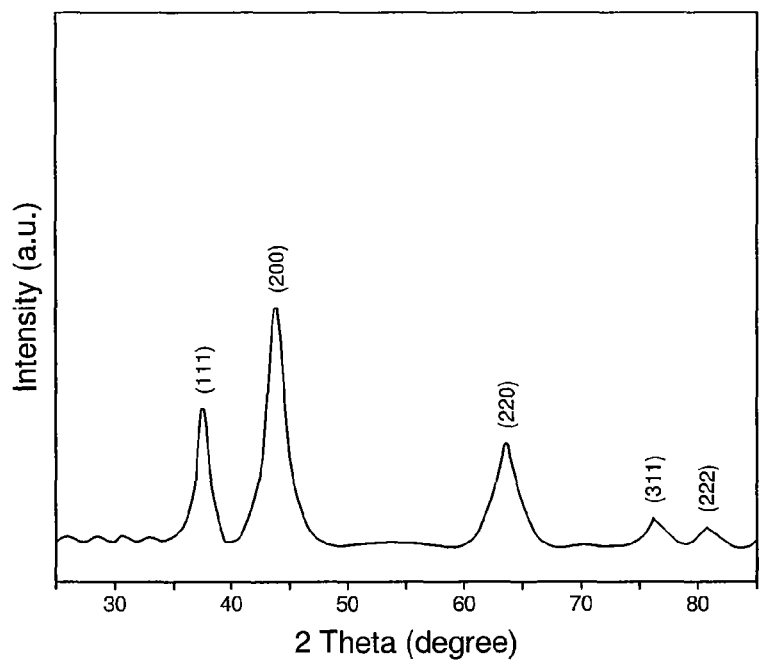
FIG. 2: XRD pattern of the carbon coated vanadium nitride.

FIG. 2 shows the XRD pattern of the carbon coated VN. All the peaks of VN are clearly visible. There has been a little increase in the particle size as can be inferred from the increased sharpness of the peaks. The primary particle size of the carbon coated VN was calculated using the Scherrer formula and found to be 8 nm, which was 60% larger than the pure, uncoated VN (5 nm). The lattice parameter was refined and calculated to be; a=4.153 Å. This value is slightly larger than that of pure VN (a=4.141 Å. Additionally, slight traces of peaks from $V_2O_3$ were observed in the pattern, although the whole thermal decomposition was done in a reducing atmosphere under $N_2$ flow. The presence of $V_2O_3$ is likely to be due to the fact that water evolves through the lactose decomposition. This water was assumed to be the most probable source of oxygen. However, the amount of $V_2O_3$ formed was negligible and found to hardly have practical consequences on the electrochemistry of VN.

Example 3

Preparation of PEDOT Nanostubs via Reverse Emulsion Directed Synthesis

The technique of reverse microemulsion in the lines of Sun et al. [38] was employed for the synthesis of PEDOT nanoparticles. Initially 8.5 g (19.12 mmol) of sodium bis(2-ethylhexal) sulfosuccinate (AOT) was dissolved in 70 ml of n-hexane in an ultrasonic bath at 100% power (410 W). Then a mixture of 1.6 g (10.00 mmol) anhydrous $FeCl_3$ in 1 ml distilled water was added dropwise with a Pasteur-pipette. When all the oxidant was added, the resulting solution was taken out of the ultrasonic bath and gently shaken by hand until a milky-yellow precipitate appeared. Then 0.38 ml of ethylenedioxythiophene (EDOT) was added to the emulsion at once. The resulting mixture was then kept at 10° C. in the rotavap for 1 h. Polymerization started when the temperature of the water bath reached about 20° C. After that the temperature of the water bath was maintained at 30° C. for 3 h. Meanwhile the reaction mixture turned green and subsequently black. The product was then suction filtered and washed with ethanol and acetone. Drying at 100° C. over night yielded a blue/black nanopowder of PEDOT.

Example 4

Electrochemical Measurements 4.1 Preparation and Procedure

Three different types of electrodes were assembled to study the electrochemical behaviour of the pure and the carbon coated VN. The first electrode was assembled of the pure VN (85%) by only mixing it with the binder (15 wt. % polyvinylidenfluoride (PVDF)) without any additional carbon black. This was done to study the properties of the pure material alone. The other two electrodes were made of the pure and the carbon coated VN, by mixing them both with carbon black and the binder. The ingredients for electrode 2 and 3 were mixed in the following weight ratio, active material: carbon black (Super P, TIMCAL): binder (PVDF)=70:15:15. In all the samples the active material and the additives were mixed and grained together by hand in a mortar. Hexane was added to mix the ingredients homogeneously and subsequently removed by evaporation. 10 to 15 mg of the samples were then hand pressed on a titanium current collector (13 mm diameter) and then the prepared electrode was dried out. The cells were assembled in an argon filled glove box using lithium metal foil as the counter electrode. The electrolyte used was MERCK Selectipur, LP30, which consists of 1 M solution of $LiPF_6$ in mixture of ethylene carbonate and dimethyl carbonate 1:1 (w/w). All electrochemical measurements were performed using a computer-controlled charger system furnished by Astrol Electronic AG, Switzerland. The cells were cycled galvanostatically in the range of 3.2-0 V vs. $Li/Li^+$ at a specific current based on the weight of active material (VN) in the electrode.

4.2 Investigation of Influence of Electrochemical Lithiation on the Structure of VN To study the influence of lithium on the structure of VN, the material was electrochemically lithiated in a galvanostatic discharge regime. The material was discharged from its open circuit potential that is slightly above 3 V to 0 V (with respect to $Li/Li^+$) using a constant current of 30 Ah/kg. It was initially observed that the first discharge showed an excessive and irreversible lithium uptake and the material properly started to reversibly cycle only after the second charge step. Hence the structure of the lithiated VN after the second discharge step which correctly resembles the chemical entity that cycles reversibly was studied further. The capacity observed in this discharge step was very close to the theoretical value of 412 Ah/kg as calculated from the Nernst equation considering the following reaction:

$$VN + Li^+ + e^- \rightarrow LiVN \qquad (3)$$

VN is a face centric cubic structure which has tetrahedral vacancies. Since the size of the lithium cation is small enough, it is reasonable to assume that lithium inserts and fills these tetrahedral vacancies inside the VN lattice. Vanadium is simultaneously reduced from an oxidation state of +3 to +2.

Figure 3:
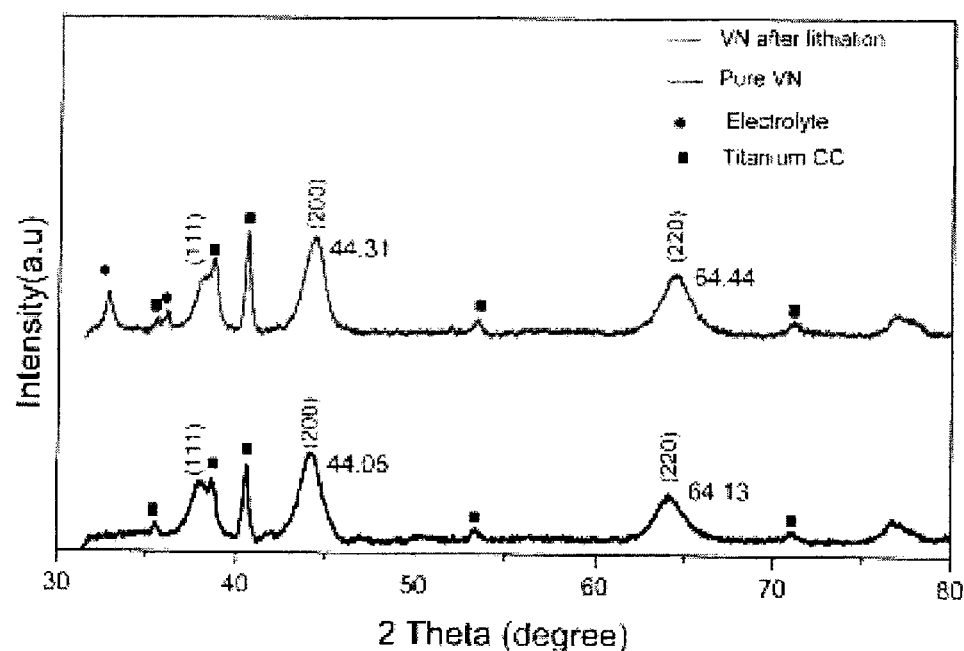
FIG. 3: XRD pattern of the pure and the lithiated VN

In the beginning all VN peaks could be clearly identified in the XRD pattern (see FIG. 3) along with the peaks of the titanium current collector. The peaks of the current collector also served as a reference to compare shifts observed from the pure to the lithiated material. After the material was lithiated, the cell was dissembled and the powder pattern of the lithiated electrode was measured. In the pattern of the lithiated material all the peaks of VN were observed with a minute forward shift. This essentially indicates that there was no change in the structure of the material after lithiation. The HRTEM image and SAED pattern of the lithiated VN (not shown in the Figures) further support this finding. No noticeable change in the morphology of the sample could be seen and the SAED pattern showed all the diffraction rings known for VN. This information illustrates the structural stability of VN as a lithium host and indicates its potential to cycle lithium without structural degradation. A series of magnetic measurements using the pure and the lithiated VN was performed to support the hypothesis that although lithiation does not induce any structural change in VN, there is a definite electronic change (due to the insertion of lithium).

Figure 4:
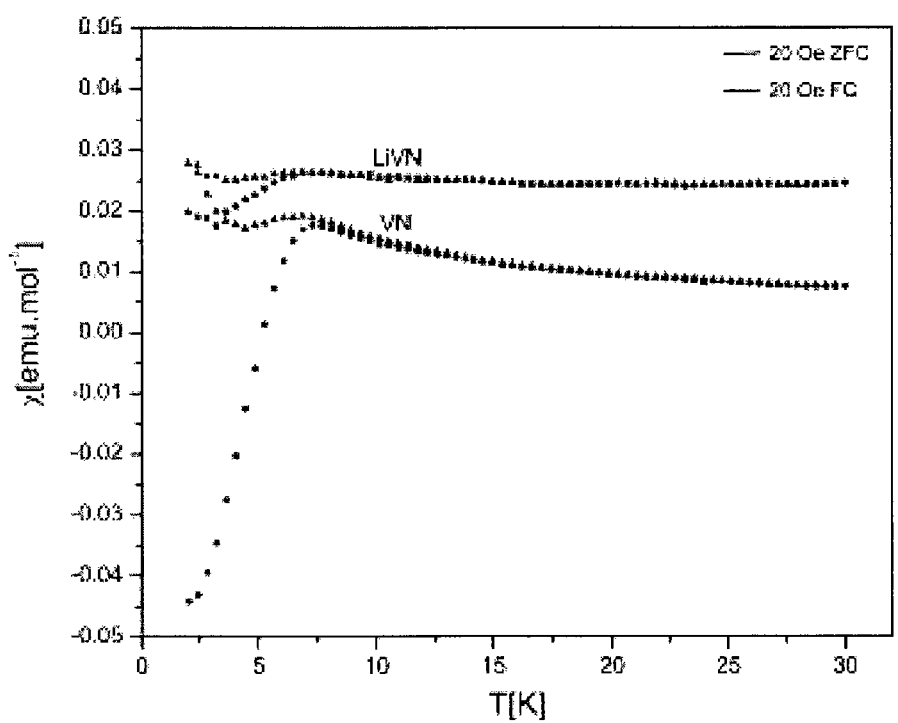
FIG. 4: Magnetic susceptibility vs. temperature plot for the pure and the lithiated VN.

FIG. 4 shows the temperature dependence of magnetic susceptibility for the pure vanadium nitride (VN) and the lithiated sample (LiVN) under the external magnetic field strength of 20 Oe. For both the samples, the upper curve in the graph represents data collected on warming the sample after it was cooled down in the presence of an external field (FC) and the bottom curve represents data collected on warming the sample after it was cooled down in the absence of any field i.e. at zero field (ZFC). The warming and cooling rates were kept constant during each sequence. For pure vanadium nitride, steep decrease of susceptibility was observed after 7K which became negative at 5K. This high diamagnetism was assumed to account for the already reported superconductivity in VN [34]. On the contrary there was only a gradual decrease of susceptibility for the lithiated phase around 7K which increased again after 3K without showing any negative susceptibility. This observation strongly indicates that there is a definite electronic change after the insertion of lithium in VN which prevents it from undergoing a superconducting transition at 5K. Moreover, in the entire temperature range the susceptiblity values for the lithiated LiVN phase were higher than for the pure VN phase. This was in very good agreement with the fact that LiVN would be a $d^3$ system having one more unpaired spin than the $d^2$ VN system, which would, as observed, result in a stronger paramagnetic response in the absence of other collective phenomena.

4.3 Electrochemical Results of Pure and Carbon Coated VN

Figure 5:
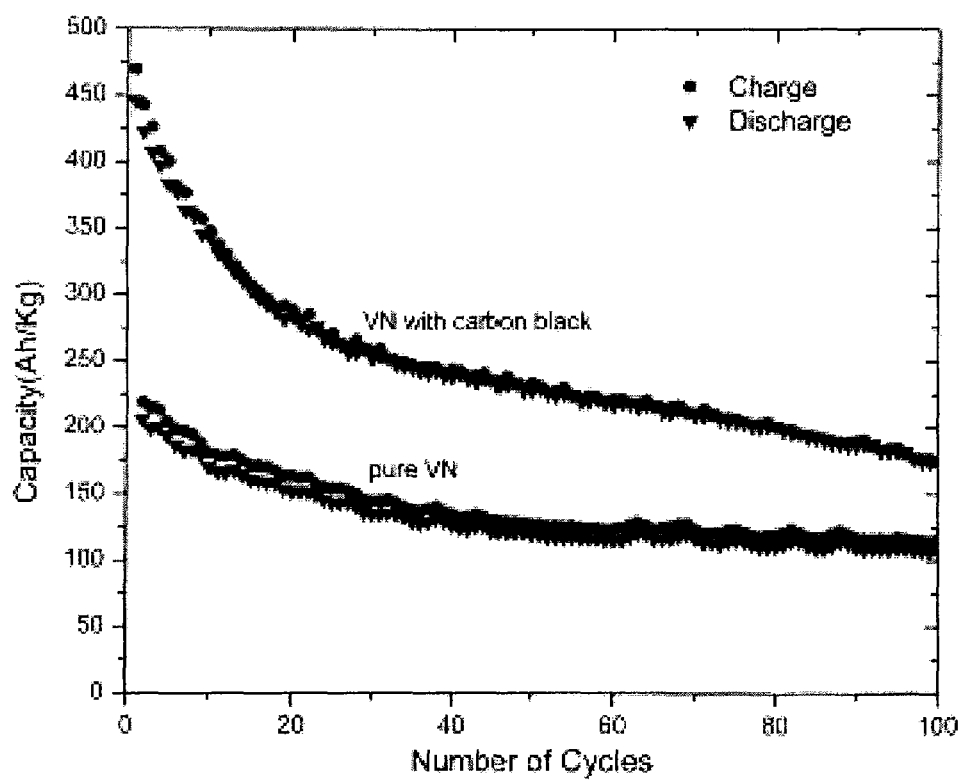
FIG. 5: Extended cycling curves of the pure VN and VN with mixed with carbon black.

The three electrodes consisting of 1) uncoated VN, mixed with binder, 2) uncoated VN mixed with carbon black and binder and d) carbon coated VN mixed with carbon black and binder were tested as negative electrodes. The cells were cycled galvanostatically in the range of 3.2-0 V vs. Li/Li+ at a specific current of 65 Ah/kg based on the weight of active material (VN) in the electrode. The first reversible discharge capacity of electrode 1) was found to be close to the theoretical capacity of VN. This capacity however dropped sharply in the first 50 cycles shedding around 60% of its value before stabilizing at around 100 Ah/kg. The electrode 2) started at a high capacity; however the capacity faded steeply and after extended cycles was tending to reach around the same value as electrode 1) (see FIG. 5).

Figure 6:
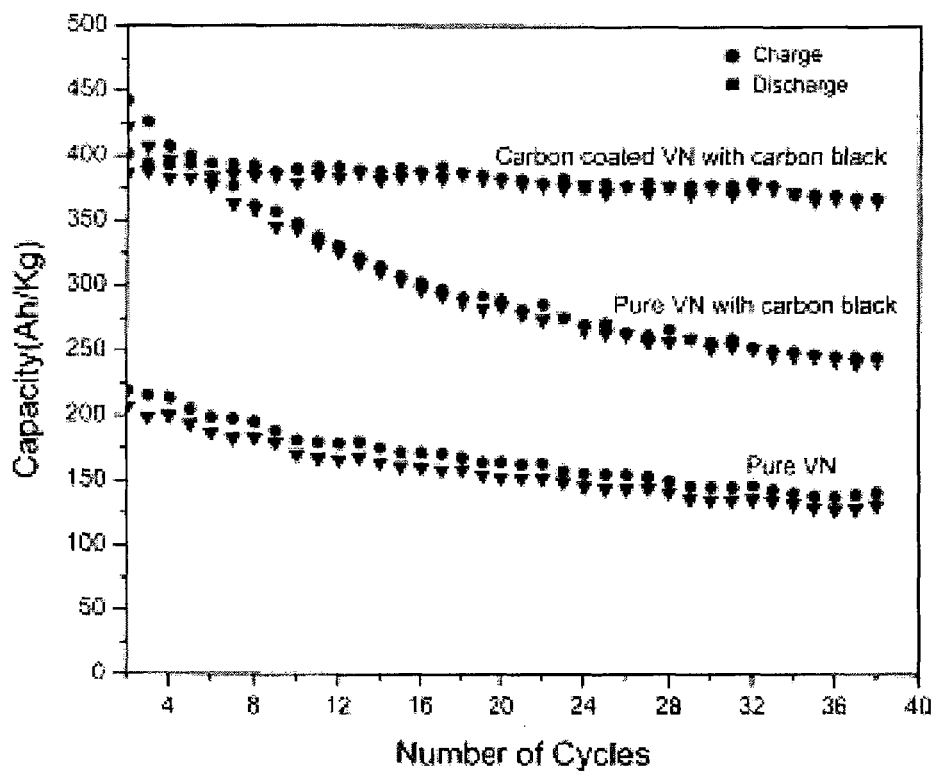
FIG. 6: Cycling curves of the pure VN, VN mixed with carbon black and the carbon coated VN mixed with carbon black.

In a stark contrast electrode 3) started with a high reversible capacity which stayed constant for the first 40 cycles (see FIG. 6). The experiment is still in progress and it remains to be seen how long he capacity remains stable (presently cycle no. 100). Considering the found stability of carbon coated VN towards lithiation it can be deducted that the capacity drop in the electrode with the pure, uncoated VN is mainly due to contact and conductivity based problems rather than to any structural decomposition. The addition of carbon black in the electrode gave the VN particles additional stability which enhanced the capacity; however upon extended cycling the carbon black binder matrix loosend up and failed to conductively hold the particles together. It was only when the particles are embedded in a robust conducting network that the loss of contact could be effectively avoided. As the experiments discussed above show, this can either be done by coating the particles with a conductive coating, e.g. a carbon coating, and by embedding them in a conductive filler (e.g. carbon black) comprising matrix. As an alternative, a nanoparticulate conductive binder, such as Poly(3,4-ethylenedioxythiophene) (PEDOT), can be used.

Whether a carbon black/graphite filled non conductive binder mixture or a nanoparticulate conductive binder are used, the carbon coat around the VN particles and the conductive particles in the conductive matrix, e.g. carbon black, provide a conductive and flexible environment to conductively hold the VN particles together during the cycles. It results in preventing any loss of charge arising from improper contact, boosts electric conductivity of the electrode and enhances the lithium diffusion to the VN particles, ultimately leading to a stable performance over extended number of cycles.

Figure 7:
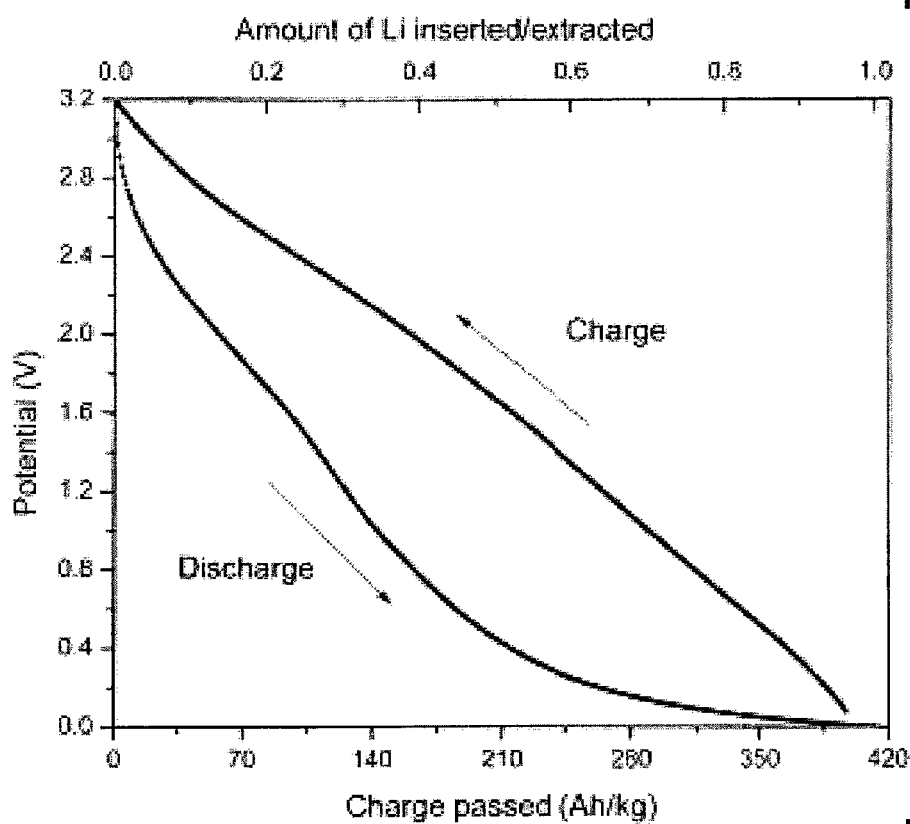
FIG. 7: Charge-discharge curve of carbon coated VN.

FIG. 7 shows a typical charge-discharge curve for carbon coated VN, in a carbon filled binder showing that voltage varies rather monotonically during lithium insertion and extraction. This indicates a single phase mechanism [35] which is consistent to the structural observations described above. However, it is still worth noticing that during discharge almost half of the net charge transfer (lithium insertion) occurred in the quasi plateau starting around 0.4 V. The charging step appeared to be much more monotonous.

Figure 8:
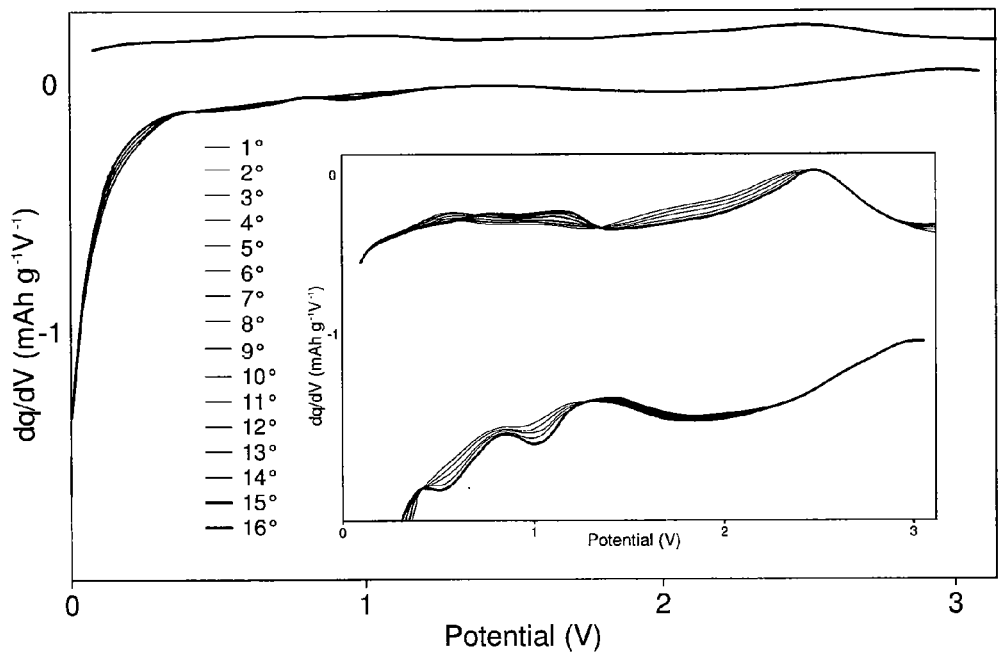
FIG. 8: Differential specific capacity plot for carbon coated VN.

The differential specific capacity (DSC) plot shown in FIG. 8 puts further light on the voltage dependence of the charge-discharge characteristics of VN (example shown: electrode 3).

The plateaus in the discharge curves are represented as peaks in the DSP plot and the compound's cycling behaviour can be examined with the change in the intensity and the positions of the peaks. FIG. 8 shows the cycling profile for the first 16 cycles of carbon coated VN in carbon black filled binder (electrode 3). As expected there were hardly any peaks in the entire voltage range except the sharp peak in the discharge zone beginning at 0.4 V representing the corresponding voltage plateau. The insert of FIG. 8 is the magnification of the DSP plot in range where other voltage sensitive steps during this seemingly monotonous process can be observed. During the charging cycle a tiny hump was found at 1.16 V and another broader peak at around 2.5 V. During discharging three distinct peaks were observed other than the sharp peak at 0.4 V. The first one at 2 V was broad and remained constant, the other two at 1 and 0.5 V appeared to be evolving with time. The evolution and intensity of all these peaks was very small in relation to the complete process and the system could be predominately defined as cycling stably and monotonously over the entire voltage range.

The experiments described herein show that nanocrystalline vanadium nitride can be synthesised at room temperature using reduction-nitridation reaction and that such produced powder is electrochemically lithiated, more specific that VN can reversibly intercalate one lithium per vanadium atom without any structural change. Electrodes with uncoated VN mixed with binder, uncoated VN mixed with carbon black and binder and carbon coated VN mixed with carbon black and binder were tested as anode materials in a lithium-ion battery. The electrode with the carbon coated VN embedded in carbon black filled binder showed the most stable cycling performance with an almost theoretical capacity of around 400 Ah/Kg for the first 40 cycles. Thus, VN nanoparticles are a promising in next generation anode material.

While there are shown and described presently preferred embodiments of the invention, it is to be distinctly understood that the invention is not limited thereto but may be otherwise variously embodied and practiced within the scope of the following claims.

REFERENCES

1) M. Fujioto, Y. Shoji, Y. Kida, R. Ohshita, T. Nohma, K. Nishio, *J. Power Sources*, 72, 226 (1998).
2) Masaki Yoshio, k Hongyu Wang, and Kenji Fukuda, *Angew. Chem.*, 115, 4335 (2003).
3) K. M. Colbow, J. R. Dahn, R. R. Hareing, *Journal of Power Sources*, 26, 397, (1989).
4) D. H. Kim, Y. S. Ahn, J. Kim, *Electrochemistry Communications*, 7, 340 (2005).
5) Martin Winter, Jürgen O. Besenhard, Michael E. Spahr, an Petr Novak, *Adv. Mater.*, 10, 725 (1998).
6) Martin Winter, Jèrgen O. Besenhard, *Electrochimica Acta*, 45, 31 (1999).
7) H. C. Shin, M. Liu, *Advanced Funct. Mater*, 15, 582 (2005).
8) D. Larcher, L. Y. Beaulieu, D. D. MacNeil, J. R. Dahn, *Journal of The Electrochemical Society*, 147, 1658 (2000).
9) Jun Chen, Lina Xu, Weiyang Li, Xinglong Gou, *Adv. Mater*, 17, 582 (2005).
10) P. L. Taberna, S. Mitra, P. Poizot, P. Simon, J. M. Tarascon, *Nature Materials*, 5, 567 (2006).
11) Yanguang Li, Bing Tan, and Yiying Wu, *Nano Lett.*, 8, 265 (2008).
12) F. Badway, N. Pereira, F. Cosandey, G. G. Amatucci, *Journal of The Electrochemical Society*, 150, A1209 (2003)
13) R. Alca'ntara, J. L. Tirado, J. C. Jumas, L. Monconduit, J. Olivier Fourcade, *Journal of Power Sources*, 109, 308 (2002).
14) F. Gillot, S. Boyanov, L. Dupont, M. -L. Doublet, M. Morcrette, L. Monconduit, J. M. Tarascon, *Chem. Mater*, 17, 6327 (2005).
15) Young Ugk Kim, Byung Won Cho, Hun-Joon Sohn, *Journal of The Electrochemical Society*, 152, 1475 (2005)
16) M. Nishijima, T. Kagohashi, M. Imanishi, Y. Takeda, O. Yamamoto, S. Kondo, *Solid State Ionics*, 83, 107 (1996).
17) M. Nishijima, T. Kagohashi, M. Imanishi, Y. Takeda, O. Yamamoto, S. Kondo, *Journal of Power Sources*, 68, 510 (1997).
18) Takahisa Shodai, Shigeto Okada, Shin-ichi Tobishima, Jun-ichi Yamaki, *Solid State Ionics*, 86, 785 (1996).
19) Y. Takeda,. Nishijima, M. Yamahata, K. Takeda, N. Imanishi, O. Yamamoto, *Solid State Ionics*, 130, 61 (2000).
20) Suzuki S. Shodai T. *Solid State Ionics*, 116, 1 (1999).
21) M. Nishijima, N. Takodoro, Y. Takeda, N. Imanishi, and O. Yamamoto, *J. Electrochem. Soc.*, 141 2966 (1994).
22) Jesse L. C. Rowsell, Vale'rie Pralong, and Linda F. Nazar, *J. Am. Chem. Soc.*, 123, 8598 (2001).
23) M. Nishijima, Y. Takeda, N. Imanishi, O. Yamamoto and M. Takano, *Journal of Solid State Chemistry*, 113, 205 (1994).
24) Jordi Cabana, Nicolas Dupré, Gwenaëlle Rousse, Clare P. Grey and Rosa Palacin, *Solid State Ionics*, 176, 2218 (2005).
25) J. Cabana, N. Dupré, C. P. Grey, G. Subias, M. T. Caldés, d A. -M. Marie, M. R. Palacina, *Journal of The Electrochemical Society*, 152 2246 (2005).
26) B. J. Neudecker, R. A. Zuhr, and J. B. Bates, in Intercalation Compounds for Battery Materials, G. A. Nazri, T. Ohzuku, and M. M. Thackeray, Editors, p. 295, PV 99-24, *The Electrochemical Socie6ty Proceeding Series*, Pennington NJ (1999).
27) N. Pereira, L. C. Klein, and G. G. Amatuccia, *J. Electrochem. Soc.*, 149, A271 (2002).
28) N. Pereira, L. Dupont, J. M. Tarascon, L. C. Klein, and G. G. Amatuccia, *Journal of The Electromechanical Society*, 150, A1273 (2003).
29) Zhen-Wen Fu Ying Wang, Xiao-Li Yue, Shang-Li Zhao, And Qi-Zong Qin, *J. Phys. Chem.* B, 108, 2236 (2004).
30) N. Pereira, M. Balasubramanian, L. Dupont, d J. McBreen, L. C. Klein, and G. G. Amatuccia, *J. Electrochem. Soc.*, 150, A1118 (2003).
31) R. Malini & U. Uma & T. Sheela & Ganesan & N. G. Renganathan, *Ionics*, 10, 11581 (2008).
32) B. R. Zhao, L. Chen, H. L. Luo, *Physics Review* B, 29, 6198 (1984).
33) Luyang Chen, Yunle Gu, LiangShi, Zeheng Yang, Jianhua Ma and Yitai Qian, *Solid State Communications*, Volume, 132, 343 (2004).
34) B. R. Zhao, L. Chen, and H. L. Luo M. D. Jack D. P. Mullin, *Phys. Rev.* B, 29, 6198 (1984).
35) Armand, M. B. Intercalation electrodes. In NATO Conference Proceedings Series VI, New York, 1980; Murphy, D. W.; Broadheead, J,.; Steele, B. C. H., Eds.; Plenum Press: New York, 145 (1980).
36) ??
37) Qian Sun and Zhen-Wen Fu, *Electrochimica Acta*, 54, 403-409 (2009).
38) Yong-Jun Li, Wei-Jun Huang, and Shi-Gang Sun, *Angewandte Chemie*, 118, 2599 (2006)

What is claimed is:

1. An anode material for a rechargeable lithium battery, the anode material being an open porous nanocomposite material comprising:
   (a) homogeneously distributed nanoparticles of electrically active anode material, referred to hereinafter as EAAM; and
   (b) nanoparticles of electrically conductive binder, hereinafter referred to as CB,
   wherein the nanoparticles of EAAM are carbon coated and arranged for undergoing lithiation in the battery,
   wherein the EAAM undergoes no substantial change of structure upon lithiation, wherein the nanoparticles of CB are mixed with the homogeneously distributed nanoparticles of EAAM so as to form an electrically conductive environment, in which the nanoparticles of EAAM are embedded, and wherein the EAAM is a transition metal interstitial nitride with one nitrogen per metal or a transition metal interstitial carbide with one carbon per metal, the nitride or carbide having a rock salt, a CsCl, a Zinc Blende, a Wurtzite or a Nickel Arsenide crystal structure type.

2. The anode material according to claim 1, wherein lithiation of the EAAM is produced by the intercalation of Lithium atoms in the crystal structure of the nanoparticles of EAAM.

3. The anode material of claim 1 wherein the nanoparticles of EAAM have mean particle sizes <500 nm, in particular mean particle sizes in the range of 5 to 500 nm, preferably in the range of 5 to 400 nm, more preferred in the range of 20 to 300 nm.

4. The anode material of claim 1, wherein the EAAM is selected from nitrides.

5. The anode material of claim 4, wherein the nitrides are selected from the group consisting of TiN, ZrN, HfN, VN, NbN, TaN, CrN, MoN, WN and mixtures thereof, preferably TiN, ZrN, VN, NbN, CrN, MoN and mixtures thereof.

6. The anode material of claim 4, wherein the nitride is vanadium nitride.

7. The anode material of claim 1, wherein the EAAM is a carbide, in particular a carbide selected from the group consisting of TiC, ZrC, HfC, VC, NbC, TaC and mixtures thereof, more preferred TiC, ZrC, VC, NbC and mixtures thereof.

8. The anode material of claim 1, wherein the electrically conducting environment comprises carbon black and/or graphite and the nanoparticles of CB, and wherein the CB is selected from the group consisting of polyisobutene, polytetrafluoroethylene, polythiophene, polyaniline, polyvinylchloride and PEDOT.

9. The anode material of claim 8, wherein the CB is selected from the group consisting of polyvinylidenfluoride and PEDOT.

10. The anode material of claim 9, wherein the electrically conducting environment comprises nanopartices of PEDOT.

11. An anode made from an anode material of claim 1, wherein the anode material is glued to a conductor such as graphite or aluminium via an adhesive, preferably the CB.

12. A method for the production of an anode in a rechargeable lithium battery, the method comprising the steps of:
  (a) providing metal nitrides and carbides as defined in claim 1; and
  (b) producing the anode.

\* \* \* \* \*